Figure 1:
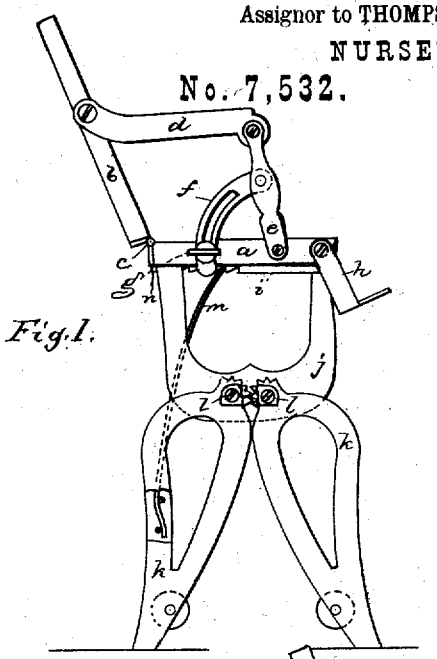

E. S. FRENCH.

Assignor to THOMPSON, PERLEY, & WAITE.

NURSERY CHAIRS.

No. 7,532. Reissued Feb. 27, 1877.

Witnesses.
Wm. F. Draper
C. E. Lusby

Inventor:
Ernestus S. French
Assr to Thompson Perley & Waite
per Lusby & Gregory Attys

N. PETERS, PHOTO-LITHOGRAPHER, WASHINGTON, D. C.

UNITED STATES PATENT OFFICE.

ERASTUS S. FRENCH, OF TEMPLETON, MASSACHUSETTS, ASSIGNOR TO THOMPSON, PERLEY & WAITE.

IMPROVEMENT IN NURSERY-CHAIRS.

Specification forming part of Letters Patent No. 179,851, dated July 18, 1876; reissue No. 7,532, dated February 27, 1877; application filed February 12, 1877.

*To all whom it may concern:*

Be it known that I, ERASTUS S. FRENCH, of Templeton, in the county of Worcester and State of Massachusetts, have invented Improvements in Child's Chair, of which the following is a specification:

This invention relates to a nursery-chair adapted to be used either as a high chair or carriage. The chair herein shown has a seat mounted upon a wooden or metallic frame, at the lower ends of which, at each side, are hinged roller-carrying legs, adapted to be equally extended and contracted to convert the high chair into a carriage, and vice versa. The legs are so pivoted that they may be moved to a further position to convert the carriage into a rocking-chair, and by other adjustments it may be converted into a reclining-chair, or into a bed.

The drawing shows side views of the apparatus in four different positions.

Figure 2:
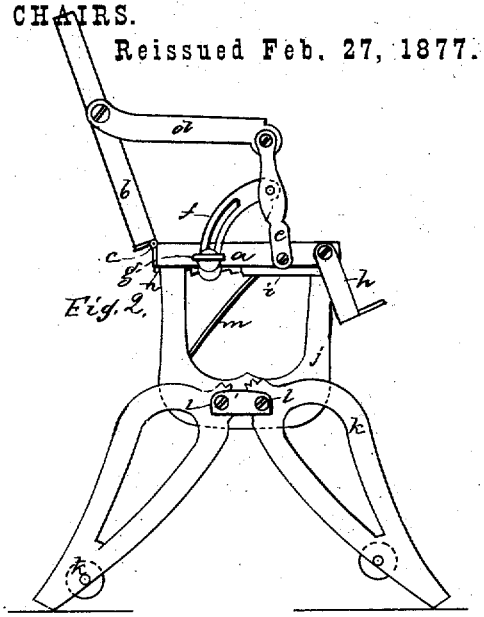
Figure 3:
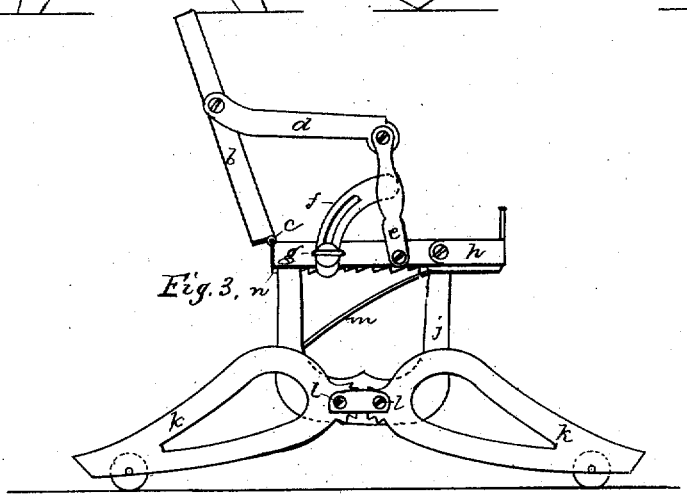
Figure 4:
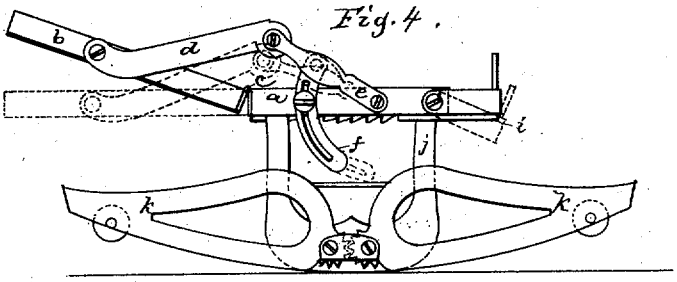

Figure 1 shows the high chair. Fig. 2 shows the chair somewhat lowered. Fig. 3 shows the adjustment by which the rollers or wheels are brought into use, so as to make a carriage. Fig. 4 shows the adjustment of the legs by which the device is changed into a rocking-chair. It also shows adjustments of the back and foot rest by which the device may be used as a reclining-chair, and also as a bed or crib.

*a* is the seat, to which the back *b* is hinged at *c*, the arms *d* and supports *e* being hinged together and to the back and seat, as shown, the slotted quadrants *f*, attached to the supports *e*, affording, by their set-screws *g*, means for securing the back in relative position to the seat. The foot-rest *h* is pivoted to the seat, as shown, and when thrown upward, as seen in Figs. 3 and 4, can be held up by adjustment of the button *i*. When the foot-rest is thus thrown up and secured it makes a head-board for the bed or crib, the back being lowered, as seen in dotted lines, Fig. 4, to make the extended flat surface needed, on which to place the bedding required. The frames *j*, which may be of wood or metal braced together, support the seat at each side. Each frame is shown as made in a single U-shaped piece, connected at its free ends with the seat, and to the cross-piece of each frame, at *l*, are pivoted two legs, *k*, parts of the legs concentric with the pivots being made as segments of gears, which mesh together, as shown. The front legs are braced together, forming a frame, likewise the rear legs, and each frame is provided with a pair of wheels or rollers. The wheels are shown applied to the legs. The frame *j* keeps the seat considerably elevated above the pivots of the legs, which is specially desirable when the chair is used as a carriage, for the legs can be made shorter than were their upper ends hinged directly to the seat.

Instead of forming or placing the geared segments as and where shown, the pivots *l l* might be made as arbors fixed in the legs and passing loosely through the frames *j*, on which arbors, and between frames *j j*, the segments could be fixed. The adjacent edges of the front and rear legs are suitably curved, so that when in the position shown in Fig. 4 they form the sweep needed for rockers of an ordinary rocking-chair, the lower edges of the frames *j j* being formed to coincide in the sweep.

To keep the legs from spreading and retain the seat elevated for a chair, the ends of the legs then resting upon the floor, a spring-pawl, *m*, is shown secured to move with the back pair of legs, which pawl, by engaging in the teeth of the rack *n*, locks the front and rear legs against spreading apart until the pawl is disengaged from the rack.

Other devices could be equally well employed to keep the front and rear legs from spreading, except at will—as, for example a quadrant and set-screw could connect the front and rear pairs of legs; or a notched bar pivoted to a front leg could be made to engage a pin fixed in a rear leg; or a pin in any leg could be made to enter any of a series of holes in one of the frames *j*. It will be observed that if either of the pairs of legs are locked the other pair is also locked, because the pairs are united by gearing.

It will be noticed that the bed or crib and the upright or the inclined adjustment of the chair can be made as a standing arrangement at any height within the capacity of the mechanism; or they may be lowered and arranged to rock, as may be deemed desirable.

I claim—

1. The combination of the chair-seat and its supporting-frame, to elevate the seat above the pivots of the legs, with legs pivoted to the frame, to be extended in front of and behind the seat, or contracted, and rollers, whereby the legs, when contracted, (their ends then resting upon the floor,) maintain the seat in an elevated position for a chair, and, when extended, the rollers rest upon the floor, to convert the chair into a carriage, substantially as described.

2. The chair-seat, its supporting-frame, to elevate the seat above the pivots of the legs, and pivoted legs and wheels, arranged between the pivotal points of the legs and the ends, which latter are adapted to rest upon the floor when the seat is elevated, in combination with devices to keep the legs contracted when the ends of the legs rest upon the floor, and to permit the legs to be extended to convert the chair into a carriage, substantially as described.

3. The chair and frame and movable curved legs pivoted thereto, so as to be extended in front of and behind the seat, or to be contracted, as described, whereby, by changes in the position of the legs with relation to the frame and seat, they support the chair-seat upon their ends, making a fixed chair, or upon their curved edges, making a rocking-chair, as set forth.

ERASTUS S. FRENCH.

Witnesses:

JOHN F. GREEN,

WM. HOLDEN.